United States Patent
Nishida et al.

(10) Patent No.: US 6,904,075 B1
(45) Date of Patent: Jun. 7, 2005

(54) ORTHOGONAL GAS LASER DEVICE (75) Inventors: Satoshi Nishida, Tokyo (JP); Kazuo Sugihara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/048,412

(22) PCT Filed: Jul. 30, 1999

(86) PCT No.: PCT/JP99/04127
§ 371 (c)(1),
(2), (4) Date: Jan. 30, 2002

(87) PCT Pub. No.: WO01/09994
PCT Pub. Date: Feb. 8, 2001

(51) Int. Cl.$^7$ .............................................. H01S 3/081
(52) U.S. Cl. ......................................... 372/93; 372/92
(58) Field of Search ............................. 372/93, 99, 96, 372/101, 107, 92

(56) References Cited

U.S. PATENT DOCUMENTS

| | | | |
|---|---|---|---|
| 3,919,663 A | * 11/1975 | Caruolo et al. | 372/107 |
| 4,306,778 A | * 12/1981 | Wada et al. | 351/211 |
| 4,500,996 A | * 2/1985 | Sasnett et al. | 372/19 |
| 4,723,256 A | * 2/1988 | Hoag | 372/93 |
| 4,757,511 A | * 7/1988 | Klingel et al. | 372/58 |
| 5,113,408 A | * 5/1992 | Bihler | 372/93 |
| 5,357,539 A | * 10/1994 | Otani et al. | 372/107 |
| 5,375,132 A | * 12/1994 | Connors et al. | 372/34 |
| 5,596,594 A | * 1/1997 | Egawa | 372/93 |
| 5,659,563 A | * 8/1997 | Reed et al. | 372/101 |
| 5,946,330 A | * 8/1999 | Ozygus et al. | 372/19 |
| 5,999,555 A | * 12/1999 | Connors et al. | 372/99 |
| 6,181,725 B1 | * 1/2001 | Schanz et al. | 372/61 |

FOREIGN PATENT DOCUMENTS

| | | | | |
|---|---|---|---|---|
| JP | 56-29969 | * | 8/1954 | |
| JP | 60-127773 | | 7/1985 | |
| JP | 61-75576 | | 4/1986 | |
| JP | 64-042872 | * | 2/1989 | .......... H01S/3/081 |
| JP | 01-233784 | * | 9/1989 | .......... H01S/3/081 |
| JP | 05-315678 | * | 5/1992 | ............ H01S/3/08 |
| JP | 05-183225 | * | 7/1993 | .......... H01S/3/105 |
| JP | 5-275778 A | | 10/1993 | |
| WO | WO 0 371 781 | * | 11/1989 | ............. H01S/3/81 |

OTHER PUBLICATIONS

Japanese abstract, 60–127773, Jul. 08, 1985.
Japanese abstract, 61–075576, Apr. 17, 1986.
Concise Statement of JP 56–29969.

* cited by examiner

Primary Examiner—Don Wong
Assistant Examiner—Tuan N. Nguyen
(74) Attorney, Agent, or Firm—Sughrue Mion, PLLC (57) ABSTRACT

One partial reflecting mirror (19) and two total reflecting mirrors (21 and 23) being placed at one end of a resonator (12) and three total reflecting mirrors (20, 22, and 24) being placed at an opposite end of the resonator (12) are included, and the reflecting mirrors (19, 21, and 23 and 20, 22, and 24) are placed so that the centers of laser light on the three reflecting mirrors (19, 21, and 23; 20, 22, and 24) placed at each end of the resonator forms a triangle. Two (19 and 21; 20 and 22) of the three reflecting mirrors (19, 21, and 23; 20, 22, and 24) placed at each end of the resonator (12) are placed at a downstream end of a discharge area in a direction in which a laser medium (10) flows.

13 Claims, 6 Drawing Sheets

OUTPUT LASER LIGHT

OVERLAP OF LASER LIGHT TURN PARTS

OVERLAP PORTIONS FOR LASER LIGHT

FIG. 5 (d)

OUTPUT LASER LIGHT

ORTHOGONAL GAS LASER DEVICE

TECHNICAL FIELD

This invention relates to an improvement in an orthogonal-type gas laser and more particularly to an improvement in an orthogonal-type gas laser which contains a resonator consisting of a partial reflecting mirror and a plurality of total reflecting mirrors and turns laser light, thereby making it possible to provide high output, save energy, and make the laser compact.

BACKGROUND ART

Figure 8:
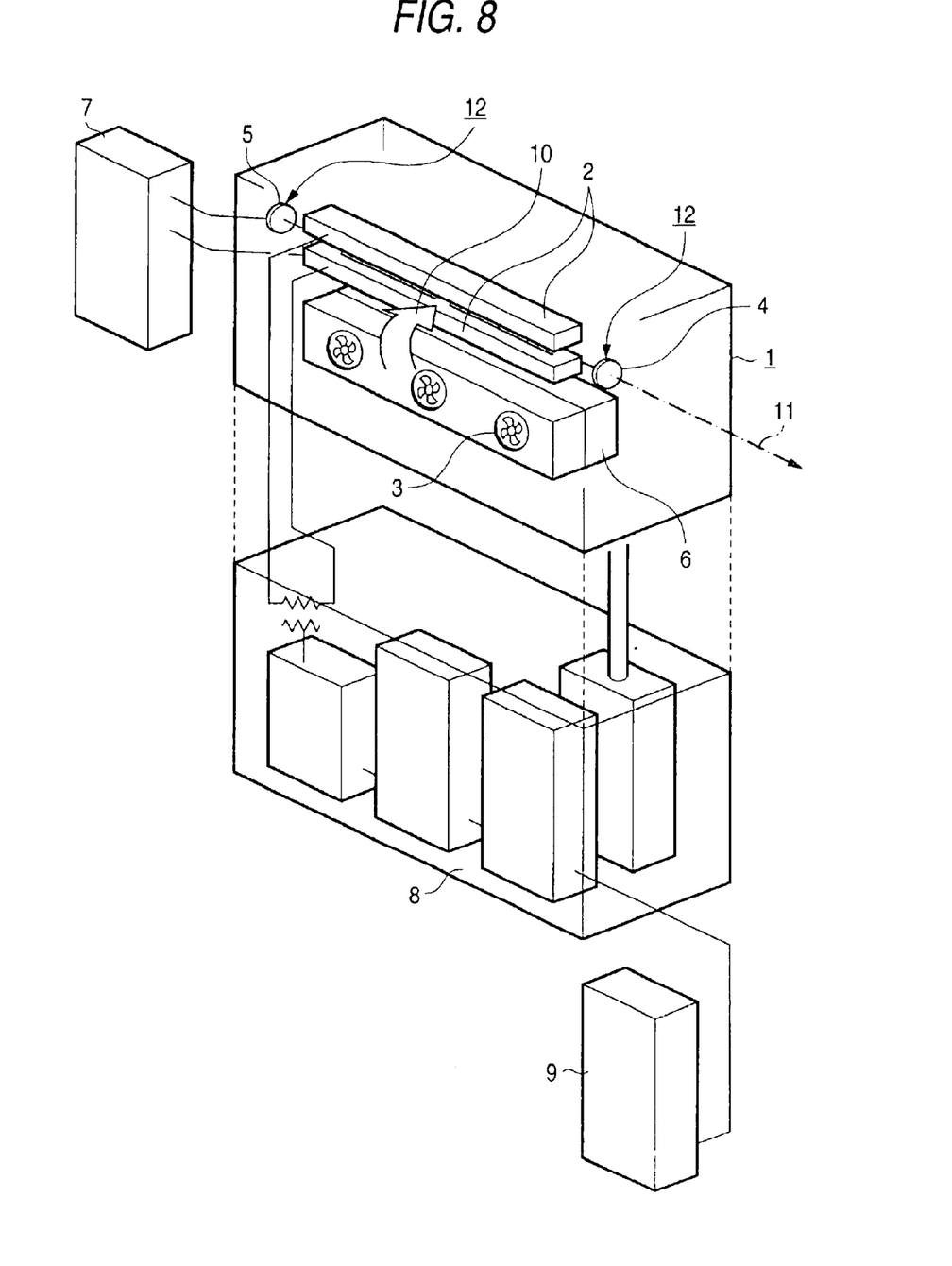
FIG. 8 is a configuration drawing to show an orthogonal-type gas laser in a related art.

FIG. 8 is a configuration drawing to show an orthogonal-type gas laser in a related art. In the figure, numeral 1 denotes a laser oscillator, numeral 2 denotes a discharge electrode in the laser oscillator 1, numeral 3 denotes a gas circulation blower in the laser oscillator 1, numeral 4 denotes a partial reflecting mirror, numeral 5 denotes a total reflecting mirror, numeral 6 denotes a heat exchanger, numeral 7 denotes a cooling unit, numeral 8 denotes a power supply panel, numeral 9 denotes a control unit, numeral 10 denotes a laser medium, and numeral 11 denotes laser light taken out from the laser oscillator 1. The partial reflecting mirror 4 and the total reflecting mirror 5 make up a resonator 12. The cooling unit 7 cools the partial reflecting mirror 4, the total reflecting mirror 5, and the heat exchanger 6. A machine for generating discharge in the discharge electrode 2, a machine for controlling the gas circulation blower 3, a machine for producing a vacuum in the laser oscillator 1, and the like are placed in the power supply panel 8.

Next, the operation of the orthogonal-type gas laser in FIG. 8 will be discussed. The machine for controlling the gas circulation blower 3 in the power supply panel 8 is driven by a start signal from the control unit 9, whereby the gas circulation blower 3 is rotated and the laser medium 10 with which the laser oscillator 1 is filled, for example, $CO_2$ gas in a carbon dioxide laser is circulated. In this state, if an output signal is given from the control unit 9, a high voltage is input to the discharge electrode 2 and the laser medium 10 is excited because of discharge. The excited laser medium 10 emits light and drops to the base level. The emitted light is reflected and amplified between the partial reflecting mirror 4 and the total reflecting mirror 5 making up the resonator 12. That is, some of the laser light is taken out to the outside from the partial reflecting mirror 4 and the remainder is further reflected on the total reflecting mirror 5 and is reflected and amplified repeatedly. The laser light 11 taken out to the outside is controlled so that the light corresponding to output of a command of the control unit 9 is taken out. The configuration in FIG. 8 is called three-axis orthogonal type because the three directions of the direction of the laser light 11, the discharge direction, and the direction in which the laser medium 10 flows between the discharge electrodes 2 are orthogonal to each other. The laser light 11 taken out from the laser oscillator 1 is transmitted to a laser beam machine, etc., and is used for working of cutting, welding, etc., measuring, etc.

Figure 9:
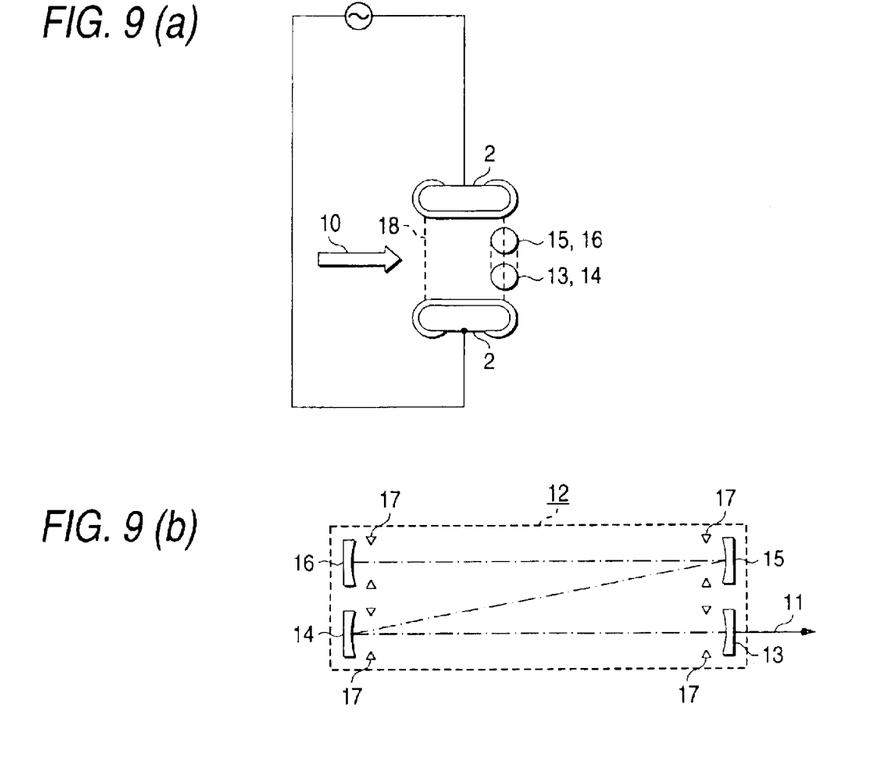
FIGS. 9(a) and 9(b) are configuration drawings to show the positional relationship between reflecting mirrors and discharge electrodes in an orthogonal-type gas laser in a related art.

FIG. 9 is a configuration drawing to show the positional relationship between reflecting mirrors and discharge electrodes in an orthogonal-type gas laser with a resonator configured for turning laser light by three total reflecting mirrors, disclosed in Japanese Patent Laid-Open No. 127773/1985. FIG. 9(a) is a sectional view of viewing laser oscillator from the optical axis direction of laser light 11. FIG. 9(b) is a sectional view of viewing laser oscillator from a direction orthogonal to the optical axis direction of the laser light 11; it shows a laser light path. In the figure, numeral 12 denotes a resonator, numeral 13 is a partial reflecting mirror, numeral 14 to 16 denote total reflecting mirrors, numerals 17 denote apertures placed in front of reflecting mirrors corresponding thereto and having a guide function of shape determination of beam mode and laser light amplification, and numeral 18 denotes a discharge space. The total reflecting mirrors 14 and 15 are placed in the laser light path between the partial reflecting mirror 13 and the total reflecting mirror 16 and the laser light reflected from the partial reflecting mirror 13 is turned three times by the total reflecting mirrors 14, 15, and 16 and then is returned on the same light path.

Figure 10:
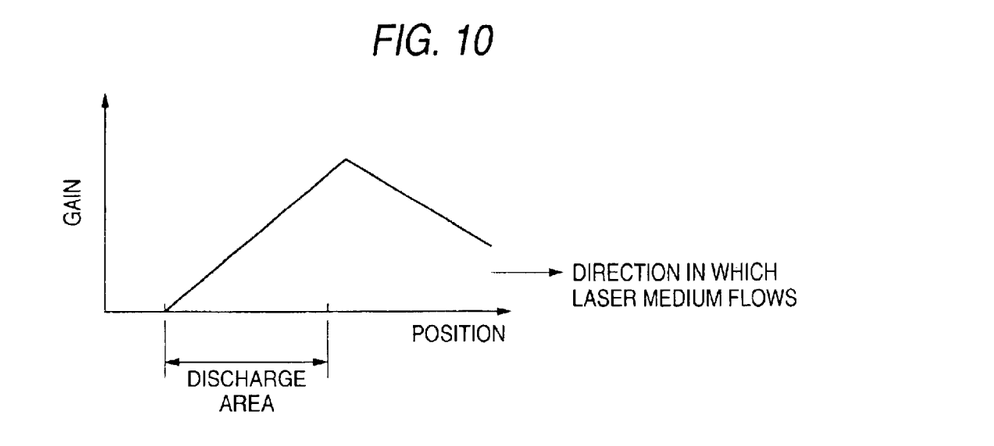
FIG. 10 is a drawing to show a gain distribution by discharge in orthogonal-type gas laser.

FIG. 10 is a drawing to show a gain distribution by discharge in orthogonal-type gas laser; it shows how the gain changes depending on the position in the direction in which the laser medium 10 flows. From FIG. 10, it is seen that the gain is higher downstream in the direction in which the laser medium 10 flows in the discharge area. Based on such a characteristic, the laser light path is also placed at the downstream end in the direction in which the laser medium 10 flows in the configuration in FIG. 9.

Next, the reason why the resonator 12 is configured for turning laser light by a plurality of reflecting mirrors as in FIG. 9 will be discussed based on theoretical expressions of lasing.

Laser output Wr is given by the following expression:

$$Wr = \eta \cdot (Wd - W0) \tag{1}$$

where $\eta$ is excitation efficiency, Wd is discharge input, and W0 is a lasing threshold value. The excitation efficiency $\eta$ is given by the following expression:

$$\eta = F \cdot \eta 0 \tag{2}$$

where F is a discharge space utilization factor and $\eta 0$ is conversion efficiency of laser medium to light.

The lasing threshold value W0 in expression (1) is given by the following expression:

$$W0 = w0/m \tag{3}$$

where w0 is a parameter derived from the loss of the whole resonator such as the transmissivity of the partial reflecting mirror forming a part of the resonator and m is the number of times laser light is returned.

From expression (1), it is seen that the higher the excitation efficiency $\eta$ and the lower the lasing threshold value W0, the larger the laser output Wr, namely, the higher the conversion efficiency to laser light. From expressions (2) and (3), it is seen that the higher the discharge space utilization factor F, the higher the excitation efficiency $\eta$ and the larger the number of times laser light is returned m, the lower the lasing threshold value W0 and therefore a high-efficiency orthogonal-type gas laser can be provided. Thus, the orthogonal-type gas laser with the resonator configured for turning laser light by a plurality of reflecting mirrors is used for the purpose of providing a compact orthogonal-type gas laser having high conversion efficiency to laser light.

Such high efficiency provided by the configuration of turning laser light by a plurality of reflecting mirrors is a characteristic phenomenon and cannot be realized until laser medium is excited by discharge while laser light is reciprocated more than once in the same discharge space. That is, it cannot be realized in the configuration in which only one optical axis exists in one laser tube like an axial-type gas laser, for example, disclosed in Japanese Utility Model Laid-Open No. 29969/1981.

The orthogonal-type gas laser has the configuration as shown above in FIG. 9 for enhancing the lasing efficiency of laser light; however, still higher efficiency is desired from the demand for energy saving in this day and age. Demand for a more compact orthogonal-type gas laser is increased from the viewpoint of saving space.

As the number of times laser light is turned is increased, efficiency can be made higher as described above, but it is difficult to further increase the number of times laser light is turned in the configuration in FIG. 9. The reason is that the spacing between the discharge electrodes is limited because of stable discharge generation and normally is 100 mm or less and it is difficult to place all optical axes at the above-mentioned downstream end from the limitations on placement of the reflecting mirrors and the structure of a holder for holding the reflecting mirrors. Further, the reason is that the shape symmetry of output laser light is degraded because of laser light overlap caused by turning laser light and directivity occurs in working using the output laser light, for example.

DISCLOSURE OF INVENTION

The invention is intended for solving the problems as described above and it is an object of the invention to provide an orthogonal-type gas laser fitted for providing high output, saving energy, and being made compact.

According to the invention, there is provided an orthogonal-type gas laser comprising a laser oscillator containing a resonator consisting of one partial reflecting mirror and a plurality of total reflecting mirrors, wherein at least five total reflecting mirrors are included.

An orthogonal-type gas laser comprises one partial reflecting mirror and two total reflecting mirrors being placed at one end of a resonator and three total reflecting mirrors being placed at an opposite end of the resonator are included, and the reflecting mirrors are placed so that the centers of laser light on the three reflecting mirrors placed at each end of the resonator forms a triangle.

Further, two of the three reflecting mirrors placed at each end of the resonator are placed at a downstream end of a discharge area in a direction in which a laser medium flows or in the proximity of the downstream end.

Further, the partial reflecting mirror is placed at the downstream end or in the proximity of the downstream end.

Also, the partial reflecting mirror is placed upstream from the downstream end and the diameter of laser light applied to the partial reflecting mirror is enlarged.

Further, the reflecting mirrors are placed so as to disperse the overlap directions of laser light turn parts on the reflecting mirrors.

The invention, which is configured as described above, provides the following advantages:

The orthogonal-type gas laser according to the invention is fitted for providing high output, saving energy, and being made compact.

The thermal distortion of the partial reflecting mirror can be suppressed.

The shape symmetry of output laser light can be enhanced.

BEST MODE FOR CARRYING OUT THE INVENTION

Embodiment 1

Figure 1:
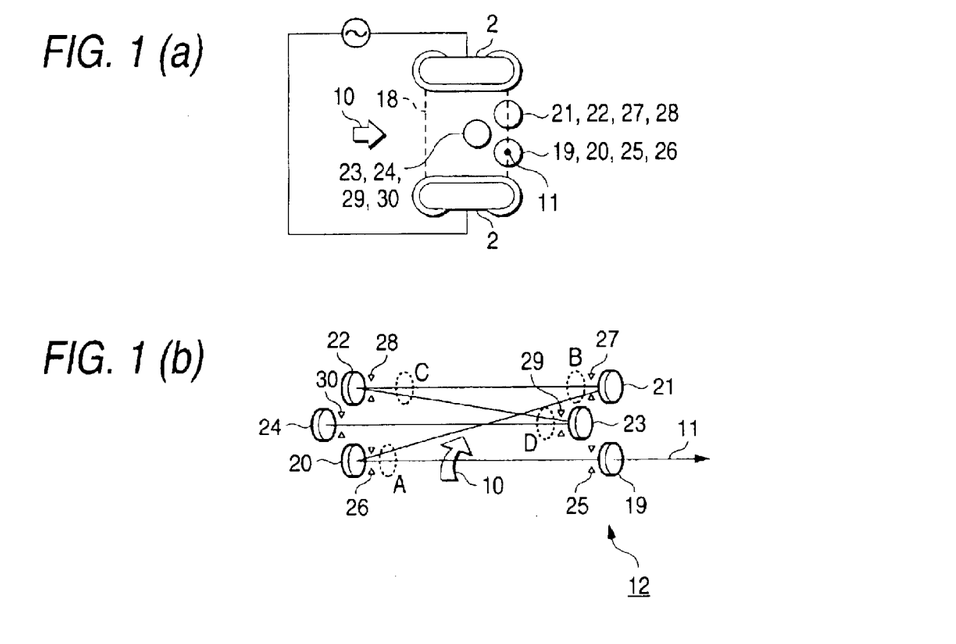
FIGS. 1(a) and 1(b) are configuration drawings to show a resonator part of an orthogonal-type gas laser according to an embodiment 1 of the invention.

FIG. 1 is a configuration drawing to show a resonator part of an orthogonal-type gas laser according to an embodiment 1 of the invention; FIG. 1(a) is a sectional view of viewing a laser oscillator from the optical axis direction of laser light 11 and FIG. 1(b) is a schematic representation to show a laser light path. In the figure, numeral 2 denotes a discharge electrode, numeral 10 denotes a laser medium, numeral 11 denotes laser light, numeral 12 denotes a resonator, numeral 18 denotes a discharge space, numeral 19 denotes a partial reflecting mirror, numerals 20 to 24 denote total reflecting mirrors, and numerals 25 to 30 denote apertures.

Next, the operation will be discussed. The basic operation of the orthogonal-type gas laser is similar to that in FIG. 8 shown in the related art. The laser medium 10 excited in the discharge space 18 is amplified in the resonator 12. In the resonator 12, laser light some of which is reflected by the partial reflecting mirror 19 is turned and is reflected on the total reflecting mirrors 20, 21, 22, and 23 in order starting at the total reflecting mirror 20 and arrives at the total reflecting mirror 24. The laser light reflected on the total reflecting mirror 24 is again reflected on the total reflecting mirrors 23, 22, 21, and 20 and arrives at the partial reflecting mirror 19 and some of the laser light is taken out as the laser light 11. Thus, the total reflecting mirrors 20 to 23 are placed in the laser light path between the partial reflecting mirror 19 and the total reflecting mirror 24 and the laser light reflected from the partial reflecting mirror 19 is turned five times by the total reflecting mirrors 20 to 24 and then is returned on the same light path.

Next, an implementing method of such a turning configuration will be discussed. It is desirable that the laser light path should be placed at the downstream end in the direction in which the laser medium flows in the discharge area from the gain distribution provided by discharge shown in FIG. 10 in the related art. However, the spacing between the discharge electrodes 2 is limited because of stable discharge generation and normally is 100 mm or less and it is difficult to place all optical axes at the above-mentioned downstream end from the limitations on placement of the reflecting mirrors and the structure of a holder. If the optical axes are placed at the above-mentioned downstream end at the termination taking out the laser light, amplification of the laser light reaches the maximum and thus good efficiency is provided. Therefore, as in FIG. 1(a), the optical axis between the apertures 25 and 26, the optical axis between the apertures 27 and 28, and the optical axis between the apertures 26 and 27 are placed at the above-mentioned down stream end and other optical axes are placed upstream from the above-mentioned down stream end, so that highly efficient and stable lasing can be provided.

Figure 2:
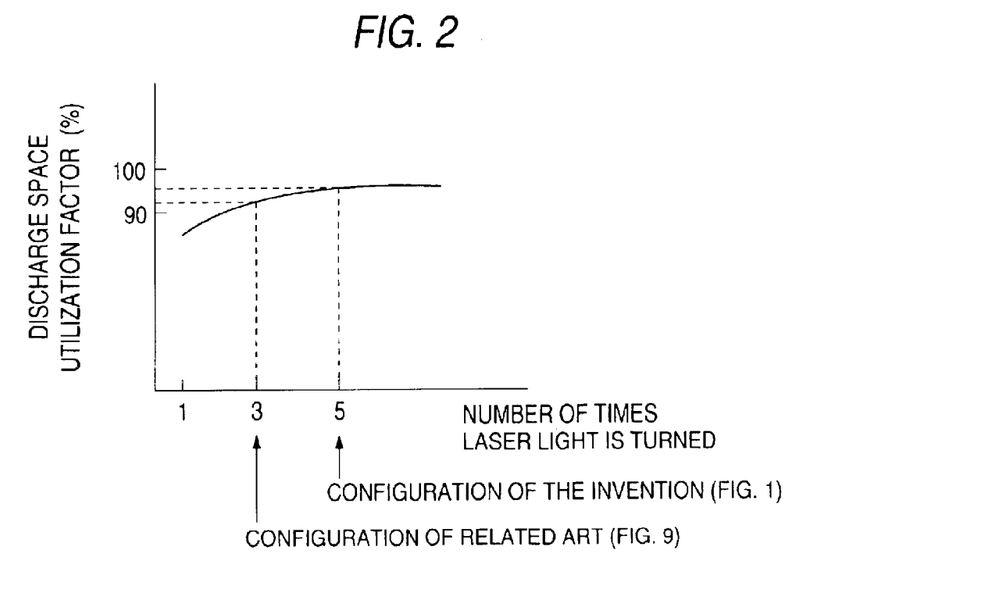
FIG. 2 is a drawing to show change in discharge space utilization factor depending on the number of times laser light is turned.

FIG. 2 shows change in discharge space utilization factor depending on the number of times laser light is turned; the configuration of the invention in FIG. 1 corresponds to the case where the number of times laser light is turned is five and the configuration of the related art in FIG. 9 corresponds to the case where the number of times laser light is turned is three. From FIG. 2, it is seen that the configuration of the invention provides a higher discharge space utilization factor than the configuration of the related art. It is also seen that the discharge space utilization factor is not much raised if the number of times laser light is turned exceeds five. Therefore, considering rise in the excitation efficiency caused by improving the discharge space utilization factor, rise in costs caused by an increase in parts of the reflecting mirrors, etc., and the like, it is adequate that the number of times laser light is turned is five. In an application to provide higher output, the number of times laser light is turned may be further increased.

Figure 3:
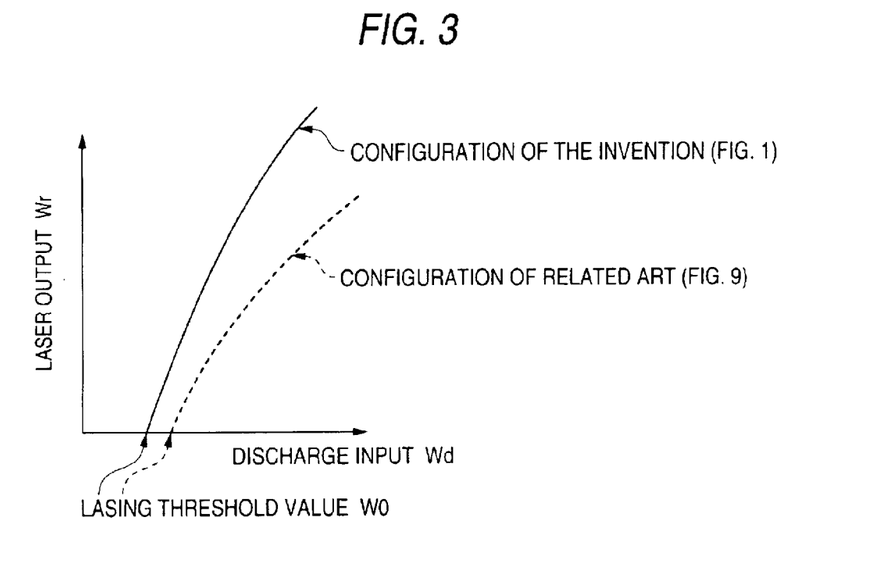
FIG. 3 is a drawing to show input/output characteristic.

FIG. 3 is a drawing to show comparison between the configuration of the invention in FIG. 1 and the configuration of the related art in FIG. 9 with respect to the input/output characteristic under the same size and input power conditions; the solid line indicates the configuration of the invention in FIG. 1 and the dashed line indicates the configuration of the related art in FIG. 9. In the configuration of the invention in FIG. 1, the out put efficiency is drastically enhanced because of improvement in the discharge space utilization factor and an increase in the number of times laser light is returned, and the configuration of the invention in FIG. 1 can provide output about 1.4 times as high as that of the configuration of the related art in FIG. 9.

Therefore, an orthogonal-type gas laser fitted for providing high output, saving energy, and being made compact can be provided.

Embodiment 2

If a resonator in an orthogonal-type gas laser is configured for turning laser light by a plurality of total reflecting mirrors, an overlap occurs in the laser light turn parts while the laser light is reflected and amplified. Taking the configuration shown in FIG. 1 in the embodiment 1 as an example, in the laser light overlap part (for example, the upper side of laser light coming from the aperture 25 and the lower side of laser light going to the aperture 27 at the position of the aperture 26 in FIG. 1), the upper side of laser light coming from the aperture 25 and the lower side of laser light going to the aperture 27 scramble for the gain in the same space, and as for the portion, only a gain of 50% each can be provided relative to the total gain 100%. Thus, the strength of the laser light overlap part drops to a half relative to the strength of a laser light non-overlap portion and the shape symmetry of laser light is degraded.

Figure 4:
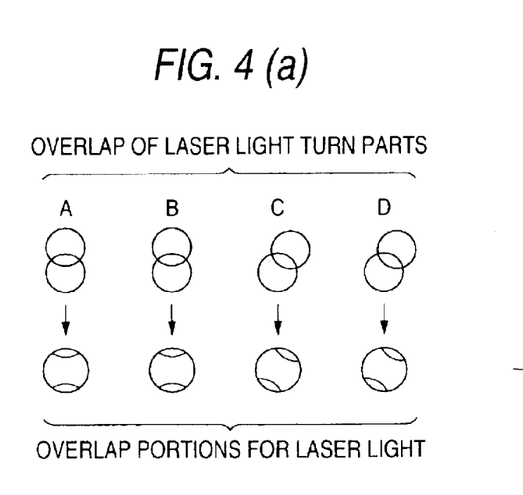
FIGS. 4(a) and 4(b) are schematic representation to show the overlap state of laser light turn parts and an example of output laser light.

FIG. 4(a) shows overlap of laser light turn parts (A to D parts in FIG. 1(b)), and the sum of the overlap portions for laser light becomes output laser light. FIG. 4(b) shows the output laser light in this case. Making a similar examination with FIG. 9 for the related art, overlap parts occur only at the top and the bottom of laser light and the shape symmetry of output laser light is more degraded. If the shape symmetry of output laser light is degraded, directivity occurs in working using the output laser light, for example.

Figure 5:
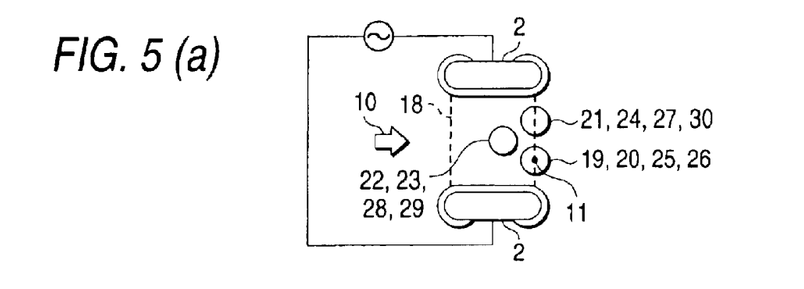
FIGS. 5(a) through 5(d) are configuration drawings to show a resonator part of an orthogonal-type gas laser according to an embodiment 2 of the invention.

FIG. 5 is a configuration drawing to show a resonator part of an orthogonal-type gas laser according to an embodiment 2 of the invention; it shows the configuration for more improving the shape symmetry of output laser light. Parts identical with or similar to those previously described with reference to FIG. 1 in the first embodiment are denoted by the same reference numerals in FIG. 5. FIG. 5(a) is a sectional view of viewing a laser oscillator from the optical axis direction of laser light 11 and FIG. 5(b) is a schematic representation to show a laser light path. In placement of reflecting mirrors and apertures in FIG. 5, unlike that of the reflecting mirrors and the apertures in FIG. 1, a reflecting mirror 22 and an aperture 28 and a reflecting mirror 24 and an aperture 30 are changed in position from those in FIG. 1. Therefore, the laser light path in FIG. 5(b) differs from that in FIG. 1(b) partially in overlap direction of laser light overlap parts. In this case, FIG. 5(c) corresponds to FIG. 4(a) and FIG. 5(d) corresponds to FIG. 4(b); the reflecting mirrors are placed and the laser light path is formed as in FIG. 5(a) and(b), whereby the overlap directions of the laser light turn parts on the reflecting mirrors are dispersed as in FIG. 5(c) and the laser light overlap portions are dispersed and placed almost on the perimeter of output laser light as in FIG. 5(d), so that the shape symmetry of the output laser light is improved.

Figure 6:
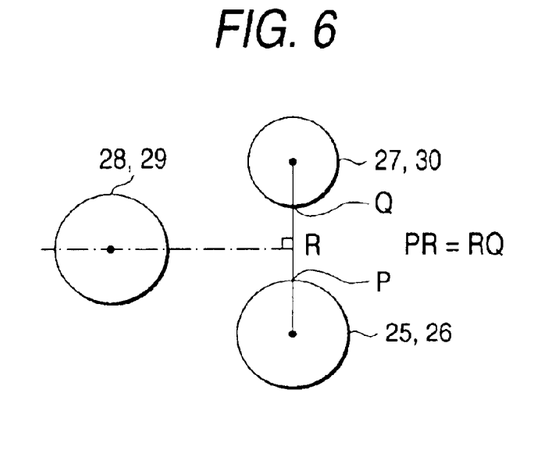
FIG. 6 is a schematic representation to show a placement method of reflecting mirrors to improve the shape symmetry of laser light when apertures differ in diameter.

In the configurations in FIGS. 1 and 5, the reflecting mirrors are placed three each at both end parts of the resonator and the center of laser light on the three reflecting mirrors at each end part of the resonator forms a triangle. This corresponds to placing the apertures 25, 27, and 29 as a triangle and the apertures 26, 28, and 30 as a triangle in the example in FIG. 1 and corresponds to placing the apertures 25, 27, and 29 as a triangle and the apertures 26, 30, and 28 as a triangle in the example in FIG. 5. Taking FIG. 5 as an example, if the apertures equal in diameter, the triangle formed by the apertures 25, 27, and 29 is an isosceles triangle with the line connecting the centers of the apertures 25 and 27 as a bottom, and the triangle formed by the apertures 26, 30, and 28 is an isosceles triangle with the line connecting the centers of the apertures 26 and 30 as a bottom. In the configuration in FIG. 5, when the apertures differ in diameter, if the center of the aperture 29 is placed at a position where a middle point R of a line PQ connecting P and Q points, the points where the line connecting the centers of the apertures 25 and 27 crosses the outside shapes of the apertures 25 and 27, is moved upstream in the direction in which a laser medium flows in parallel with discharge electrodes as shown in FIG. 6, the shape symmetry of the output laser light is improved.

Embodiment 3

A partial reflecting mirror for taking out laser light involves excessive heat input and has a problem of occurrence of thermal distortion, etc. To relieve such thermal distortion, a method of enlarging the diameter of laser light applied to the partial reflecting mirror for decreasing the heat input amount per unit area is the most effective. In the placement of the reflecting mirrors and the apertures in FIG.

1 in the embodiment 1 and in FIG. 5 in the embodiment 2, the total reflecting mirror 21 and the aperture 27 are placed above the partial reflecting mirror 19 and the aperture 25 and thus it is difficult to physically enlarge the diameter of laser light applied to the partial reflecting mirror 19. Then, if the partial reflecting mirror 19 and the aperture 25 are placed so that neither reflecting mirror nor aperture comes above or below them as shown in FIG. 7, as compared with the cases in FIGS. 1 and 5, the termination for taking out laser light moves to the upstream end from the downstream end in the direction in which the laser medium flows in the discharge area and thus output is a little lowered, but it is made possible to enlarge the diameter of laser light applied to the partial reflecting mirror 19 by changing the resonator as the curvature of the reflecting mirror is changed, etc., changing the mode order, etc.

Figure 7:
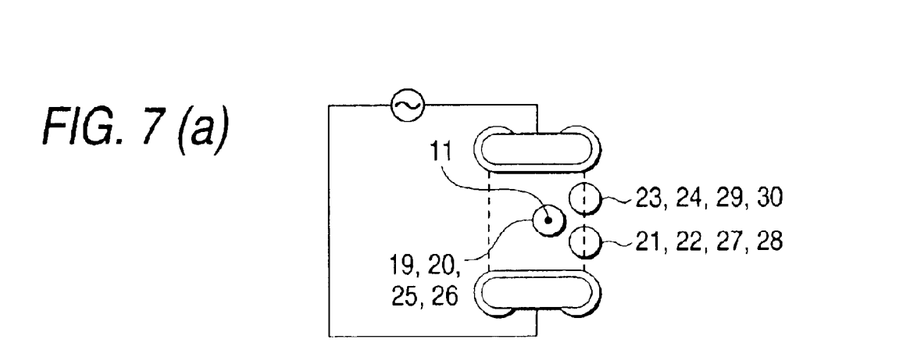
FIGS. 7(a) and 7(b) are configuration drawings to show an orthogonal-type gas laser according to an embodiment 3 of the invention.

Therefore, the thermal distortion of the partial reflecting mirror can be suppressed by adopting placement of reflecting mirrors and laser light path as in FIG. 7.

Industrial Applicability

As described above, the orthogonal-type gas laser according to the invention can provide high output, save energy and be made compact and thus production itself of the orthogonal-type gas laser is industrially valuable. Further, the orthogonal-type gas laser is fitted for use in industries of working measuring, etc.

What is claimed is:

1. An orthogonal-type gas laser comprising:
    a laser oscillator containing a resonator consisting of one partial reflecting mirror and a plurality of total reflecting mirrors, wherein
    one of said partial reflecting mirror and two of said plurality of total reflecting mirrors are placed at one end of said resonator,
    three of said plurality of total reflecting mirrors are placed at an opposite end of said resonator, and
    two of said three total reflecting mirrors placed at each end of said resonator are placed at a downstream end of a discharge area in a direction in which a laser medium flows or in the proximity of the downstream end and said partial reflecting mirror is placed upstream from the downstream end and the diameter of laser light applied to the partial reflecting mirror is enlarged so that centers of laser light on said three total reflecting mirrors placed at each end of said resonator forms a triangle.

2. The orthogonal-type gas laser as in claim 1, wherein said reflecting mirrors are placed so as to disperse overlap directions of laser light turn parts on said reflecting mirrors.

3. An orthogonal-type gas laser comprising:
    a laser oscillator containing a resonator including one partial reflecting mirror and at least five total reflecting mirrors, wherein
    said partial reflecting mirror and two of said at least five total reflecting mirrors are placed at one end of said resonator,
    three of said at least five total reflecting mirrors are placed at an opposite end of said resonator, and
    said two of said at least five total reflecting mirrors are placed at a downstream end of a discharge area in a direction in which a laser medium flows or in the proximity of the downstream end, and so that centers of laser light continuously turned in the discharge area by said three total reflecting mirrors placed at each end of said resonator forms as triangle.

4. The orthogonal-type gas laser as in claim 3, wherein said reflecting mirrors are placed so as to disperse overlap directions of laser light turn parts on said reflecting mirrors.

5. The orthogonal-type gas laser as in claim 3, wherein two of said three reflecting mirrors placed at each end of said resonator are placed at a downstream end of a discharge area in a direction in which a laser medium flows or in the proximity of the down stream end.

6. The orthogonal-type gas laser as in claim 5, wherein said reflecting mirrors are placed so as to disperse overlap directions of laser light turn parts on said reflecting mirrors.

7. The orthogonal-type gas laser as in claim 5, wherein said partial reflecting mirror is placed at the downstream end or in the proximity of the downstream end.

8. The orthogonal-type gas laser as in claim 7, wherein said reflecting mirrors are placed so as to disperse overlap directions of laser light turn parts on said reflecting mirrors.

9. The orthogonal-type gas laser as in claim 5, wherein said partial reflecting mirror is placed upstream from the downstream end and the diameter of laser light applied to said partial reflecting mirror is enlarged.

10. The orthogonal-type gas laser as in claim 9, wherein said reflecting mirrors are placed so as to disperse overlap directions of laser light turn parts on said reflecting mirrors.

11. The orthogonal-type gas laser as in claim 1, wherein said triangle is an isosceles triangle.

12. The orthogonal-type gas laser as in claim 1, wherein the diameter of laser light applied to said partial reflecting mirror is larger than that applied to at least one of said at least five total reflecting mirrors.

13. The orthogonal-type gas laser as in claim 3, wherein said triangle is an isosceles triangle.

* * * * *